United States Patent
Pierce et al.

(10) Patent No.: US 6,856,985 B1
(45) Date of Patent: Feb. 15, 2005

(54) SERVER BASED CONTROL OF ROBOTIC LIBRARIES

(75) Inventors: Randy Pierce, Golden, CO (US); Carla Mowers, Longmont, CO (US); Leslie Kaye Miller, Lafayette, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/546,652

(22) Filed: Apr. 10, 2000

(51) Int. Cl.[7] .......................... G06F 17/30; G06F 7/00; G11B 15/00
(52) U.S. Cl. .......................... 707/1; 700/214; 700/215; 360/92
(58) Field of Search .................. 707/1–3, 10, 200–205, 707/500, 513; 715/513; 700/214–217; 360/92; 709/200–203, 229, 723; 414/4

(56) References Cited

U.S. PATENT DOCUMENTS 5,546,315 A * 8/1996 Kleinschnitz ............... 700/218
5,881,311 A * 3/1999 Woods ............................ 710/4
6,349,408 B1 * 2/2002 Smith ......................... 717/168

FOREIGN PATENT DOCUMENTS

WO        WO99/48007          9/1999

OTHER PUBLICATIONS

"Disk Drive with Embedded Hyper–Text Markup Language Server", IBM Technical Disclosure Bulletin, IBM Corp., New York, US, vol. 38, No. 12, Dec. 1, 1995, p. 479.
Fielding, R. et al.; Hypertext transfer Protocol—HTTP/1.1; Jun. 1999; pp. 1–143.

* cited by examiner

Primary Examiner—Alford W. Kindred
(74) Attorney, Agent, or Firm—Yee & Associates, LLP (57) ABSTRACT

A method and apparatus for controlling a storage library through a network. A request originating from the network is received, wherein the request is in a protocol and includes a command for the storage library. A type for the request is identified. The request in the protocol is translated into a format used by the storage library to form a type specific request for the storage library in response to the type corresponding to a type for the storage library. The type specific request is sent to the storage library.

49 Claims, 8 Drawing Sheets

Figure 11 http://hostname/servlet/MsApiServletName?xml=<request>...</request>

```
                    1200
<request>
<command><commandName/></command>
<parms>
<parmName>parmValue<//parmName>0:N
</parms>
</request>
```

Figure 12

```
                 1300
<request>
<command><mount/></command>
<parms>
<cartridge>RB1400</cartridge>
<drive>simba</drive>
</parms>
</request>
```

Figure 13

```
<command>...</command>
<ack>...</ack>            1400
<echo>...</echo>
<result>...</result>
<query_result>...</query_result>
<error_result>...</error_result>
<final>...</final>
```

Figure 14

```
                           1500
<?xml version="1.0" standalone="yes"?>
<response>
<command><mount/></command>
<ack><request_id>12</request_id></ack>
<echo>some client information</echo>
<result_list>
<result>
<cartridge>RB1400</cartridge><drive>simba</drive>
</result>
</result_list>
<final>
<done/><success_count>1</success_count>
<failure_count>0</failure_count>
</final>
</response>
```

SERVER BASED CONTROL OF ROBOTIC LIBRARIES

BACKGROUND OF THE INVENTION

1. Technical Field

The present invention relates generally to an improved data processing system and in particular to a method and apparatus for managing data within a data processing system. Still more particularly, the present invention relates to a method and apparatus for handling data stored in magnetic tape cartridges.

2. Description of Related Art

For years now magnetic tape cartridges have proven to be an efficient and effective medium for data storage, including backing up data from primary storage devices and acting as primary storage devices for infrequently accessed data. A tape cartridge is a housing containing magnetic tape. The tape cartridge, which is also referred to as a "tape", may be wound onto one or more reels within the housing.

Large computer systems have a need to access numerous cartridges. To this end, automated cartridge handling systems or libraries for cartridges have been developed for making the cartridges automatically available to the computer. Many of these automated libraries resemble jukeboxes. These automated libraries are also referred to as "automated cartridge systems" and may contain thousands of cartridges within a single automated cartridge system. The cartridges within an automated cartridge system are accessed using automated or robotic systems. In some systems, a robotic arm moves around within a housing containing cartridges stored in array holders or slots and moves the cartridges. The robotic arm is used to move a cartridge from the array to a tape drive. The robotic arm also is used to remove a cartridge from a tape drive and place the cartridge back into the array. These automated libraries also include automated mechanisms to introduce and remove tapes from the library.

Many of these automated cartridge systems are accessed through a network. The network client protocols for these automated cartridge systems are often proprietary and are not easy to develop, port, maintain, and extend. Currently, access to an automated cartridge system from a client location requires installation of software encompassing the proprietary protocol. Porting the protocols to different platforms to control these automated cartridge systems is difficult, especially in view of the many different types of platforms that have to be supported for different customers.

Therefore, it would be advantageous to have an improved method and apparatus for controlling robotic libraries, such as automatic cartridge systems.

SUMMARY OF THE INVENTION

The present invention provides a method and apparatus for controlling a storage library through a network. A request originating from the network is received, wherein the request is in a protocol and includes a command for the storage library. A type for the request is identified. A storage library having a storage library type corresponding to the type is identified. The request in the protocol is translated into a format used by the storage library to form a type specific request for the storage library in response to the type corresponding to a type for the storage library. The type specific request is sent to the storage library.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
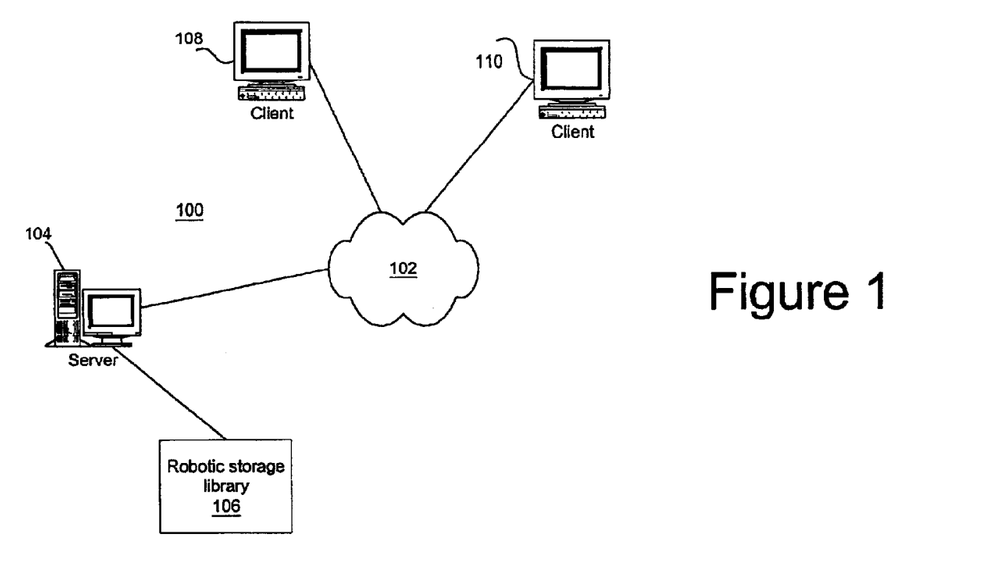
FIG. 1 is a diagram of a distributed data processing system in accordance with a preferred embodiment of the present invention.

With reference now to the Figures and in particular, with reference now to FIG. 1, a diagram of a distributed data processing system is depicted in accordance with a preferred embodiment of the present invention. Distributed data processing system 100 includes a network 102, a server 104, a robotic storage library 106, and clients 108 and 110.

Server 104, in this example, is a Web server and network 102 is the Internet, representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

In this example, robotic storage library 106 may be controlled by client 108 or client 110 across network 102. In these examples, protocols specific to robotic storage library 106, are not required to be implemented at client 108 or client 110. Instead, these protocols are implemented at server 104. In the depicted examples, Web pages or applets are sent to a client, such as client 108, to provide a graphical user interface (GUI) to control robotic storage library 106. The commands issued from client 108 to robotic storage library 106 are sent over network 102 using a markup language protocol over hypertext transfer protocol (HTTP). This markup language may be, for example, extensible markup language (XML) or hypertext markup language (HTML). The commands sent include, for example, tape movement in a library, tape movement into and out of a library, mixed media management, resource sharing, system interrogation, and system administration. With tape movement, these commands may involve those for mounting and dismounting tapes to and from tape drives. Mixed media management includes preventing or allowing tapes of certain types to be mounted on appropriate types of tape drives. System interrogation involves identifying or accessing contents within the library.

In these examples, the XML protocol is implemented on the server side on server 104 through servlets. A servlet is a Java application that runs in a Web server or application server and provides server-side processing, typically to access a database or perform e-commerce processing. Servlets are portable between servers and operating systems because the servlets are written in Java. In this example, an application programming interface (API) is implemented in a servlet in which the API is used to access a particular robotic storage library. The API, in these examples, implements the protocol used to communicate with the robotic storage library. In these examples, the mechanisms used in the present invention may be distributed to a server and a client through Java archive files (JAR).

As a result, client 108 may access robotic storage library 106 without having to implement the particular protocol for robotic storage library 106 at client 108. Further, the present invention allows a user to access robotic storage library 106 from any client connected to network 102.

Figure 2:
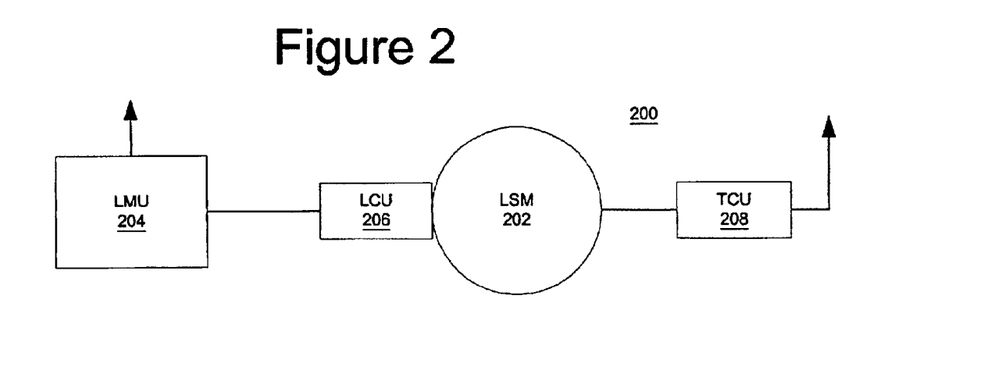
FIG. 2 is a robotic storage library in accordance with a preferred embodiment of the present invention.

With reference now to FIG. 2, a robotic storage library is depicted in accordance with a preferred embodiment of the present invention. In this example, robotic storage library 200 takes the form of an automated cartridge system (ACS). Robotic storage library 200 includes a library storage module (LSM) 202, a library module unit (LMU) 204, a library control unit (LCU) 206, and a tape control unit (TCU) 208.

LSM 202 contains the mechanisms necessary for automated cartridge handling. A storage area for magnetic tape cartridges is found within LSM 202. Further, an optical system for identifying the correct tape cartridge, a servo-controlled electromechanical mechanism for selecting a cartridge and delivering it to a correct tape drive, and a housing for operator safety and data security also are part of LSM 202. LMU 204 acts as a controller and interprets commands from host computers and relays appropriate instructions to LSM 202. LMU 204 may act as a controller for more than one LSM. LCU 206 is an inboard controller located at LSM 202. LCU 206 provides an interface between LMU 204 and the mechanisms located within LSM 202. For example, LCU 206 provides an interface to a robotic mechanism used to handle tape cartridges within LSM 202. TCU 208 is employed to handle data access in LSM 202. For example, TCU 208 handles reading and writing data to and from tape drives located within LSM 202. LMU 204 and TCU 208 are in communication with a host computer, such as server 104 in FIG. 1.

More information on this particular type of robotic storage library may be found in Moy et al., *Automated Cartridge System*, U.S. Pat. No. 4,864,511. Robotic storage library 200 in FIG. 2 is presented as an example of a particular type of robotic storage library, which may be used with the present invention and is not intended as an architectural limitation to the present invention.

Figure 3:
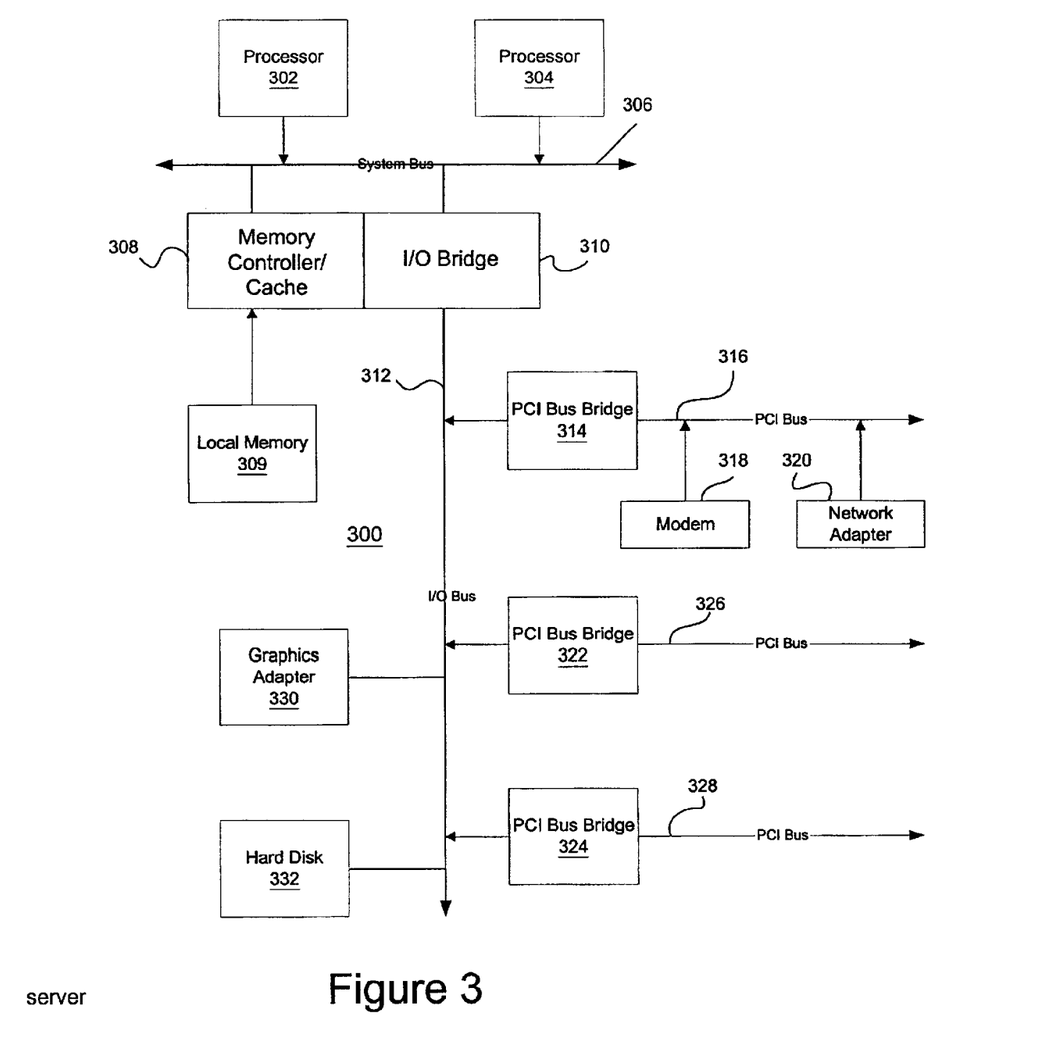
FIG. 3 is a block diagram of a data processing system that may be implemented as a server in accordance with a preferred embodiment of the present invention.

Referring to FIG. 3, a block diagram of a data processing system that may be implemented as a server, such as server 104 in FIG. 1, is depicted in accordance with a preferred embodiment of the present invention. Data processing system 300 may be a symmetric multiprocessor (SMP) system including a plurality of processors 302 and 304 connected to system bus 306. Alternatively, a single processor system may be employed. Also connected to system bus 306 is memory controller/cache 308, which provides an interface to local memory 309. I/O bus bridge 310 is connected to system bus 306 and provides an interface to I/O bus 312. Memory controller/cache 308 and I/O bus bridge 310 may be integrated as depicted.

Peripheral component interconnect (PCI) bus bridge 314 connected to I/O bus 312 provides an interface to PCI local bus 316. A number of modems may be connected to PCI bus 316. Typical PCI bus implementations will support four PCI expansion slots or add-in connectors. Communications links to clients 108 and 110 in FIG. 1 may be provided through modem 318 and network adapter 320 connected to PCI local bus 316 through add-in boards.

Additional PCI bus bridges 322 and 324 provide interfaces for additional PCI buses 326 and 328, from which additional modems or network adapters may be supported. In this manner, data processing system 300 allows connections to multiple network computers. A memory-mapped graphics adapter 330 and hard disk 332 may also be connected to I/O bus 312 as depicted, either directly or indirectly.

Data processing system 300, in theses examples, contains the processes necessary to receive requests for a client, such as client 108 in FIG. 1, to control or access a robotic storage library, such as robotic storage library 106 in FIG. 1. In the depicted examples, the processes are implemented using known Web server engines and servlets incorporating APIs designed to communicate and interface with the robotic storage library.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

Figure 4:
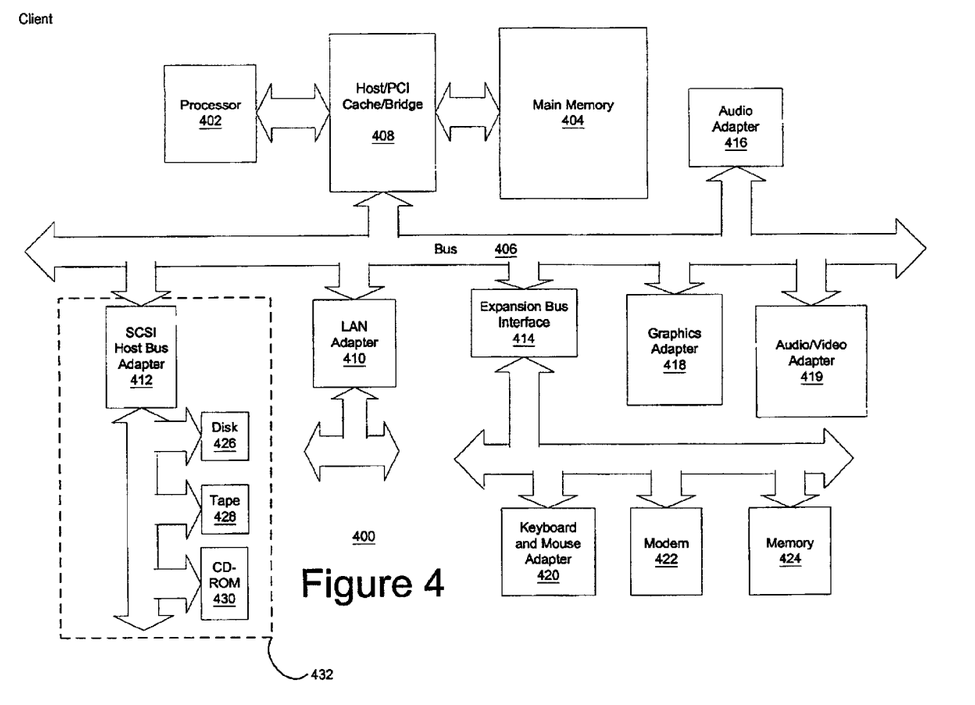
FIG. 4 is a block diagram illustrating a data processing system in which the present invention may be implemented.

With reference now to FIG. 4, a block diagram illustrating a data processing system in which the present invention may be implemented. Data processing system 400 is an example of a client computer, such as client 108 or client 110 in FIG. 1.

Data processing system 400 employs a peripheral component interconnect (PCI) local bus architecture. Although the depicted example employs a PCI bus, other bus architectures such as Accelerated Graphics Port (AGP) and Industry Standard Architecture (ISA) may be used. Processor 402 and main memory 404 are connected to PCI local bus 406 through PCI bridge 408. PCI bridge 408 also may include an integrated memory controller and cache memory for processor 402. Additional connections to PCI local bus 406 may be made through direct component interconnection or through add-in boards. In the depicted example, local area network (LAN) adapter 410, SCSI host bus adapter 412, and expansion bus interface 414 are connected to PCI local bus 406 by direct component connection. In contrast, audio adapter 416, graphics adapter 418, and audio/video adapter 419 are connected to PCI local bus 406 by add-in boards inserted into expansion slots. Expansion bus interface 414 provides a connection for a keyboard and mouse adapter 420, modem 422, and additional memory 424. Small computer system interface (SCSI) host bus adapter 412 provides a connection for hard disk drive 426, tape drive 428, and CD-ROM drive 430.

An operating system runs on processor 402 and is used to coordinate and provide control of various components within data processing system 400 in FIG. 4. The operating system may be a commercially available operating system, such as Windows 2000, which is available from Microsoft Corporation. An object oriented programming system such as Java may run in conjunction with the operating system and provides calls to the operating system from Java programs or applications executing on data processing system 400. "Java" is a trademark of Sun Microsystems, Inc. Instructions for the operating system, the object-oriented operating system, and applications or programs are located on storage devices, such as hard disk drive 426, and may be loaded into main memory 404 for execution by processor 402.

In these examples, data processing system 400 includes the processes used to provide a GUI for controlling a robotic storage library, such as robotic storage library 106 in FIG. 1. This interface is implemented in a number of ways. For example, the GUI may take the form of Web pages or an applet loaded on a browser. A browser is a program that is used to search through a set of data. In the depicted example, XML is the format in which requests are sent between data processing system 400 and a server to control a robotic storage library. Proprietary protocols or protocols specific for a particular robotic storage library are unnecessary. The same interface may be used to control different types of robotic storage libraries through these mechanisms.

Those of ordinary skill in the art will appreciate that the hardware in FIG. 4 may vary depending on the implementation. Other internal hardware or peripheral devices, such as flash ROM (or equivalent nonvolatile memory) or optical disk drives and the like, may be used in addition to or in place of the hardware depicted in FIG. 4. Also, the processes of the present invention may be applied to a multiprocessor data processing system.

The depicted example in FIG. 4 and above-described examples are not meant to imply architectural limitations. For example, data processing system 400 may be a personal digital assistant (PDA) device, which is configured with ROM and/or flash ROM in order to provide non-volatile memory for storing operating system files and/or user-generated data. Further, data processing system 400 also may be a notebook computer or hand held computer in addition to taking the form of a PDA. Data processing system 400 also may be a kiosk or a Web appliance used to control a robotic library, such as an automated cartridge system.

Figure 5:
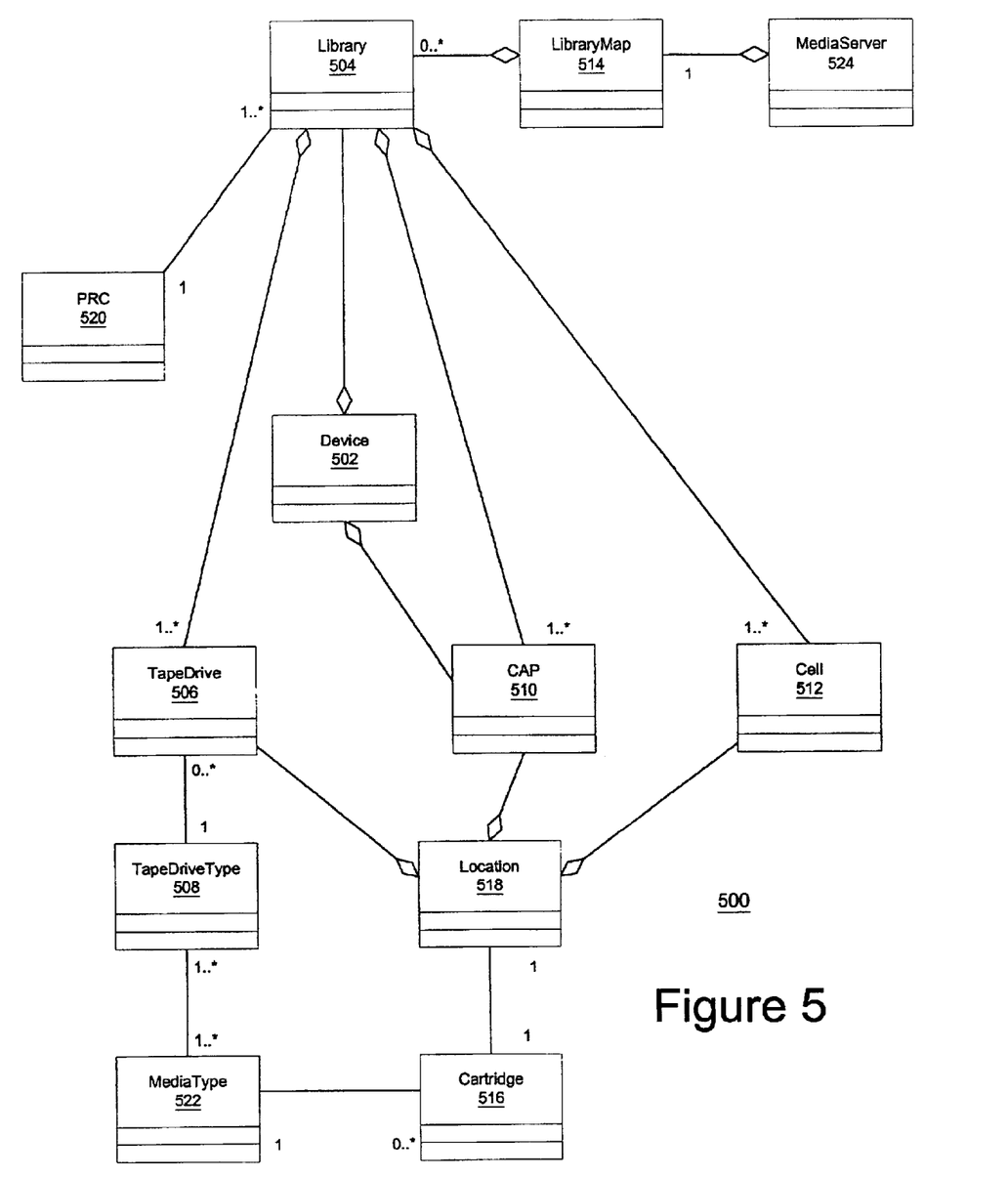
FIG. 5 is a domain model of components used to provide server based control of robotic storage libraries in accordance with a preferred embodiment of the present invention.

Turning next to FIG. 5, a domain model of components used to provide server based control of robotic storage libraries is depicted in accordance with a preferred embodiment of the present invention. Domain model 500 is in the form of a universal modeling language (UML) class diagram. Domain model 500 provides an example of components used for control of robotic storage libraries in the form of an automated cartridge system (ACS) and is not intended as an architectural limitation to the present invention.

Domain model 500 includes a device 502, a library 504, a tape drive 506, a cartridge access port (CAP) 510, and a cell 512. Device 502 is the class that maintains the common state and behavior for all the physical devices represented in the object framework. The specializations of this class include library 504, tape drive 506, and CAP 510.

Library 504 is a logical representation of a physical library, such a robotic storage library 200 in FIG. 2. Operations on library 504 include the movement of tape cartridges and interrogations of contents happen against objects, such as library 504. A collection of library objects currently defined to the system is kept in a library map 514.

Next tape drive 506 is a logical representation of a physical tape drive containing tape drive attributes such as tape drive type 508. Operations such as dismounting a tape and interrogation of contents are issued against these objects.

CAP 510 is a logical representation of an import/export port for a robotic storage library. CAP 510 not a library main door but is a small door found on many robotic libraries, which is used for entering and ejecting tape cartridges without interfering with the normal operation of the robotic storage library. Operations involving entering and ejecting cartridges into or out of a robotic library would be issued against objects, such as CAP 510.

Next, cell 512 is a logical representation of a cartridge cell within a robotic storage library. In other words, cell 512 represents a location in which a cartridge tape is placed within a robotic storage library. Cartridge 516 is a logical representation of a singular piece of media, such as a tape cartridge.

CAP 510, cell 512, and tape drive 506 are objects having a location 518, which describes how the given physical entity may be found within the robotic storage library. Location 518 is used, in these examples, by a robot to a particular object. On a small computer system interface (SCSI), robotic libraries location 518 equates to an element address, but on proprietary libraries, location 518 may be a different representation. The product uses a panel row column (PRC) 520, which is a persistent object used to internally represent the physical layout of library 504. This internal layout is used in order to generate logical device locations, which make sense to operators for physical libraries that are undoubtedly different in physical size, shape, dimension, and cell layout.

Cartridge 516 and tape drive type 508 are objects associated with a media type 522. This association allows a determination to be made as to whether a given cartridge is suitable for operation within a given tape drive. This process allows for what is commonly referred to as "mixed media" support.

Assess to library 504 by a client is provided using media server 524 through library map 514.

Figure 6:
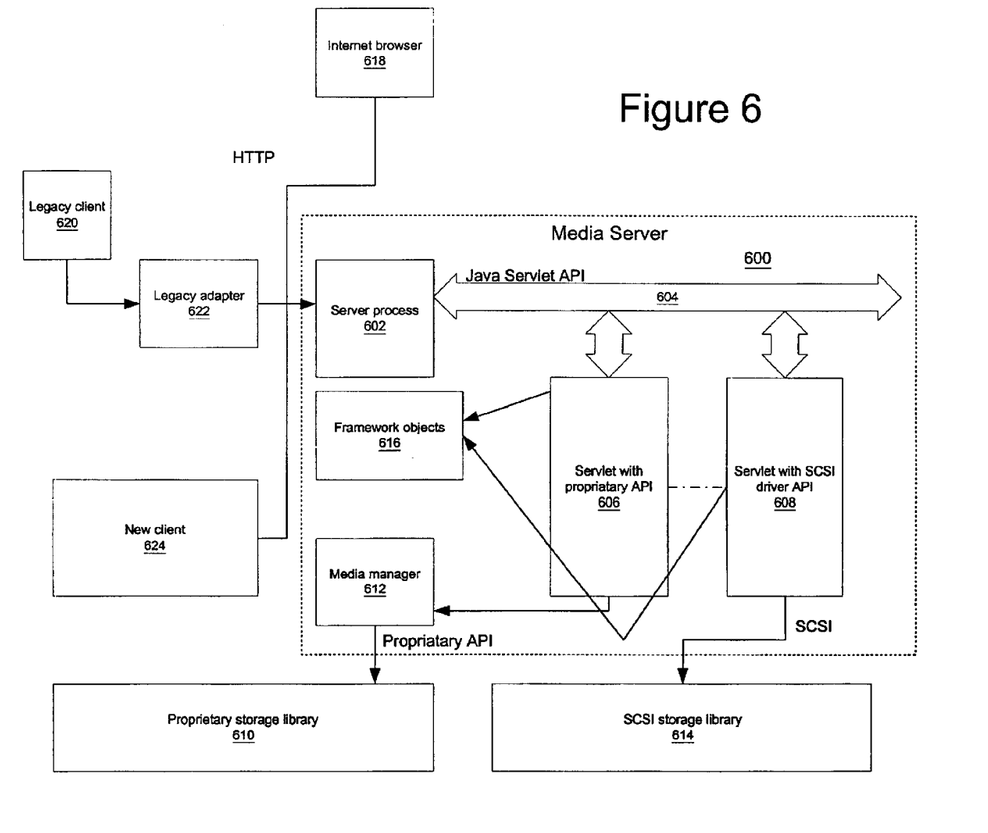
FIG. 6 is a diagram of software components used to provide access to a robotic storage library over a network in accordance with a preferred embodiment of the present invention.

With reference next to FIG. 6, a diagram of software components used to provide access to a robotic storage library over a network is depicted in accordance with a preferred embodiment of the present invention. In this example, media server 600 may be implemented using data processing system 300 in FIG. 3 and is illustrative of media server 524 in FIG. 5.

Media server 600 includes a server process 602, which serves to receive requests and send responses using HTTP. In this example, server process 602 includes a Java virtual machine (JVM), which executes Java programs used to process requests. When a request is received, Java servlet application program interface (API) 604 calls or initiates a servlet, such as servlet 606 or servlet 608. In this example, servlet 606 is a servlet including a proprietary API used to access proprietary storage library 610 through media manager 612.

Media manager 612 takes the form of a servlet and is implemented as an extension of the standard servlet class. When a client first requests a servlet, the server process 602 determines if the specific servlet class is currently loaded into memory. If servlet class is not currently loaded, the web server class loader in server process 602 will load the servlet into memory and run the servlet in it's own thread. Once the media manager 612 is active, a method corresponding to the request (e.g. GET or POST) will be invoked on the specific servlet object. This mechanism provides a very efficient mechanism for processing requests. The GET or POST methods are always mapped to a media manager internal command class, which will perform the actions required.

Much of the specific code for media manager 612 is contained in objects that are instantiated as needed by this servlet as singleton. Singleton objects hold a reference to themselves. Therefore, these objects stay loaded even when the initial need for them is gone. This way the media manager framework formed by these objects stays in memory regardless of which servlets are in memory. The framework objects that represent libraries contain code, which encapsulate the API for the protocol of the specific library being represented.

Servlet 608, in this example, includes a small computer system interface (SCSI) API, which is used to access a SCSI storage library 614.

The calls to these libraries are-made using framework objects 616. These framework objects are used to persist data and support servlet 606 and servlet 608. A framework object from framework work objects 616 is instantiated by servlets, such as servlet 606 and servlet 608. These objects are instantiated inside of a JVM in server process 602.

Media server 600 receives calls to access proprietary storage library 610 and SCSI storage library 614 from clients over a network. In this example, requests are received from clients. In these examples, a client may send requests using Internet browser 618, legacy client application 620 and legacy adapter 622, or new client application 624. HTTP requests are generated from these components and sent to server process 602 within media server 600.

An applet is sent to Internet browser 618 to provide a GUI to access the storage libraries. Alternatively, Web pages may be used for the interface in Internet browser 618. A user at Internet browser 618 may select a command for either proprietary storage library 610 or SCSI storage library 614 using the same GUI. This situation is made possible through the use of placing processes using proprietary or device specific protocols within media server 600. The requests are sent using a common protocol for the network, such as XML. The commands generated by the GUI at Internet browser 618 are mapped to the appropriate servlet within media server 600 by server process 602.

Legacy client application 620 also provides a GUI for accessing a storage library but generates requests in a legacy or proprietary protocol. Access is provided to clients containing these types of applications over the network through the use of legacy adapter 622. Legacy adapter 622 serves to translate calls made by legacy client application 620 into a format commonly used on the network, such as XML. This translated request is then sent to media server 600 for processing. When responses are received from media server 600, legacy adapter 622 also serves to translate the response back into a format for display by legacy client application 620.

Further, users may access storage libraries through new client application 624, which already incorporates the selected protocol, such as XML. In this manner, downloading of applets or Web pages to the client is unnecessary. Thus, the mechanism of the present invention allows access to storage libraries through a number of different clients. This feature is enabled through the use of a protocol commonly used on the network.

Figures 7, 8, 9, 10:
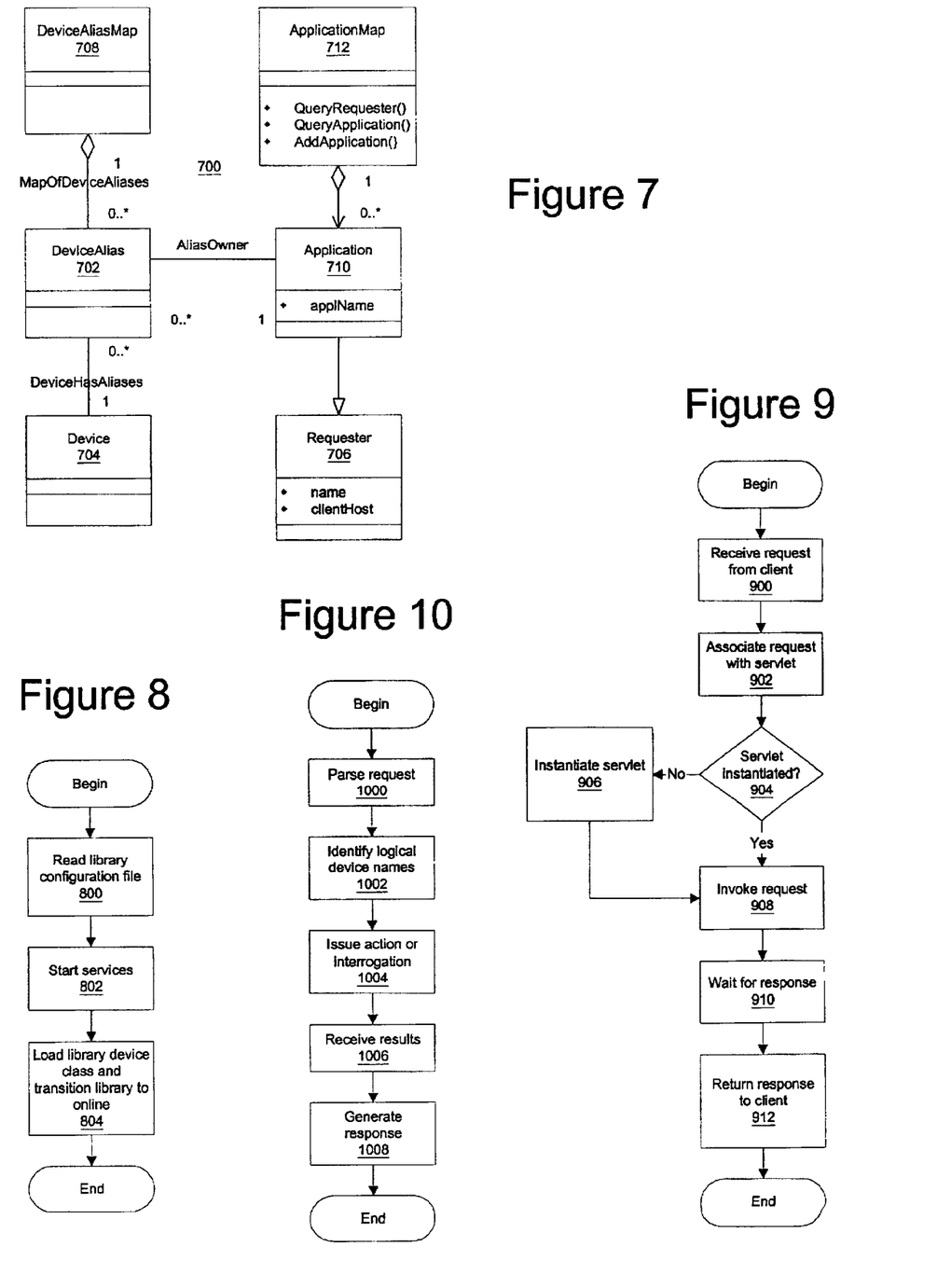
FIG. 7 is an illustration of associations used to correspond requests to robotic storage libraries in accordance with a preferred embodiment of the present invention.
FIG. 8 is a flowchart of a process for initializing services in accordance with a preferred embodiment of the present invention.
FIG. 9 is a flowchart of a process for handling a request received by a server process in accordance with a preferred embodiment of the present invention.
FIG. 10 is a flowchart of processes used in a servlet in accordance with a preferred embodiment of the present invention.

Turning to FIG. 7, an illustration of associations used to correspond requests to robotic storage libraries is depicted in accordance with a preferred embodiment of the present invention. Diagram 700 is a UML diagram providing associations between objects used to process requests from a client. Device alias 702 allows an association of a name for a given client with device 704. All requests from requester 706 are required to specify devices (library, drive, CAP) by a device alias name, rather than an absolute address. In other words, device alias 702 is the name that requester 706 will use to refer to device 704. All of the alias names, such as device alias 702, are stored in device alias map 708, which is a persistent object.

Application 710 registers an "applicationName" in application map 712 to allow resolution of device alias 702 to device 704.

Media manager provides servlets that allow management of the Framework application service. These servlets map to the functionality of QUERYREQUESTER, QUERYAPPLICATION, and ADDAPPLICATION. QueryRequester returns a list of which requesters are currently active. QueryApplication returns a list of currently defined applications, and AddApplication allows a client to define a new application to the media manager.

Application 710 uses the "applicationName" as the value corresponding to the "requester" element tag in all of its requests. Application 710 is used to associate an actual device name, such as actual device 704, with aliases for the device, such as device alias 702 found in the request. This association is made using application map 712. When responses are sent back to the client, such as requester 706, application map 712 is used to translate the device names back into alias names for the client to preserve the integrity of the client application view. In this manner, the client only sees the alias name and is not required to know the actual device name.

Application 710 also may set device aliases for all of the devices required by application 710. Default names may be automatically assigned for each new application.

An administrator for a media server, such as media server 600 in FIG. 6, can establish mappings between device alias names and product logical devices on a per-requester basis. In these examples, a default mapping for the product default client is present. The administrator also may delete alias names for specific requester-device associations. If such an alias has been deleted then the mechanism of the present invention will not make that device or any contained devices (such as drives in libraries), or any tape cartridges contained in that device, visible to that requester. In this way, an administrator can implement a regimen for cooperative device and cartridge sharing among clients.

Responses use device alias names corresponding to the requester specified in the <requester>xxx</requester> element tag, as shown in Table 1.

TABLE 1

| | |
|---|---|
| Requester | The name of the requester. The element tag named requester provides this value. This is a one to one mapping between the client and the application; i.e. an application is an internal representation of the requester. |
| Device Alias | The name by which the requester will refer to the device. |
| Device Name | The name by which The product knows the device. |

With reference now to FIG. 8, a flowchart of a process for initializing services is depicted in accordance with a preferred embodiment of the present invention. The processes in FIG. 8 may be implemented in a server process, such as server process 602 in FIG. 6. The server process starts services, which contain classes within a class path for the server processes. These classes are typically those required by servlets corresponding to specific requests. This initialization process is typically initiated when the server processes process the first request.

The process begins by reading a library configuration file (step 800). The library configuration file is read to identify a list of currently configured libraries. Services are then started. (step 802). These services include, for example, event handling, request tracking, alias mapping, device mapping, and error logging. Library device classes are loaded and transitioned to be logically on line for each robotic storage library (step 804) with the process terminating thereafter. Library objects contain logical states of online and offline for a library device. The process of bringing a library device online from the offline state involves recovery of the device. The methodical series of steps for recovery include the following:

First, reading the contents of the library occurs. These include, for example, cartridges, drives, and CAPS. Next, all contained devices and cartridges are added to the system. This step includes instantiating any necessary objects from a set of framework object, such as framework objects 616 in FIG. 6. A determination also is made as to whether any duplicate names of cartridges are encountered. Duplicates are processed by renaming the cartridges within the media manager to unique names indicating that cartridges are duplicated. Each contained device (CAPS or drives) is transitioned from offline to online and process any duplicate or unknown cartridges discovered in the contained devices are automatically given unique logical names that identify them as duplicates while allowing them to be used by the system. Unreadable cartridges get a unique virtual name indicating that they are unreadable. If there are no errors encountered, set the device state and the state of all contained devices to online.

With reference now to FIG. 9, a flowchart of a process for handling a request received by a server process is depicted in accordance with a preferred embodiment of the present invention. The steps illustrated in FIG. 9 may be implemented in a server process, such as server process 602 in FIG. 6.

The process begins by receiving a request from a client (step 900). In these examples, the request is received in the form of an XML document received as an HTTP request. Next, the request is associated with a servlet (step 902). This servlet is, for example, servlet 606 or servlet 608 in FIG. 6. The association of the request with a servlet is made using the servlet name in the resource name portion of the XML request. This association may be made using application map 710 in FIG. 7. After a servlet is identified, a determination is made as to whether the servlet has been instantiated (step 904). If the servlet has not been instantiated, the servlet is then instantiated (step 906). A request is then invoked on the servlet (step 908). The process proceeds directly to step 908 from step 904 if the servlet has already been instantiated. The process then waits for a response from the servlet (step 910). In this example, the response that the process waits for is in the form of an XML document.

When the response is received, this response is returned to the client (step 912) with the process terminating thereafter. The response received contains the actual device name and not the alias name used by the client. As part of turning the response to the client in step 912, the process will use an application map, such as application map 712 in FIG. 7, to translate the device name back into an alias. This process is handled by the servlet rather than the server processes in these examples. For example, this translation step may be handled by servlet 608 in FIG. 6, rather than by server process 602 in FIG. 6.

With reference now to FIG. 10, a flowchart of processes used in a servlet is depicted in accordance with a preferred embodiment of the present invention. These processes may be implemented in a servlet, such as servlet 606 or servlet 608 in FIG. 6.

The process begins by parsing a request received from server processes (step 1000). The request parsed in step 1000, in this example, is the XML document received from the client. From this parsing, logical device names are identified (step 1002). An application, such as application 710 in FIG. 7, is used to translate the alias name provided in the request into the actual device name. In this manner, a client using a specific application will have an application view of the system based on the client's set of defined aliases. The client does not require to know the actual device name. The alias device name is translated into the actual device or logical name. Next an action or interrogation is issued against the corresponding logical device or service classes (step 1004). Actions and interrogations are implemented as methods against either device objects or service objects. Once a library is online, the library has a list of cartridges and devices contained within it. The library object has methods that can satisfy most interrogations by retrieving data from its inventory lists.

In some cases the library object will invoke a request to the hardware via the encapsulated API in order to satisfy a request or action. When hardware requests are necessary, the library object updates its internal inventory to keep the inventory consistent with the hardware library that the inventory is representing.

This action or interrogation is initiated using an API contained within the servlet. This API is one that performs the appropriate call to the logical device or service classes.

In response to the action or interrogation issued, a result is received from the logical device or service classes (step 1006). The results may contain an indication that the action or interrogation has occurred successfully. Additionally, the result may include exceptions or errors occurring. A response is generated (step 1008) with the process terminating thereafter. In this example, an XML document containing the results is generated to return the response. If errors or exceptions occur, this information is placed into the XML document. If the action or interrogation is successful, any data gathered, as well as any other results of the actions are formatted into the XML document. In the depicted examples, device names are translated back into alias names, corresponding to the requester specified in the request field of the request received by the server.

In the examples illustrated above, the protocol used to transfer requests and responses over the network take the form of HTTP and XML. In particular, clients may use HTTP GET or HTTP POST methods to send requests to a server, such as media server 600 in FIG. 6. The actual format used depends on the implementation. The mechanism of the present invention may be implemented using HTTP, as found in *Hypertext Transfer Protocol (HTTP)* 1.1 *Specification*, RFC 2616, which is available from the Internet Engineering Task Force. In these examples, all servlets will return an HTTP success status code of 200. The response information provided will contain specific details regarding the success or failure of the specific HTTP request. An HTTP success status code other than 200, e.g. a 404-status code, is an indication of a user error specifying the servlet URL or an improper server configuration. HTTP Informational status codes, 1xx, and Redirection status codes, 3xx, may be returned by the product as specified for the HTTP protocol.

In the depicted examples, each client request opens a new URL because of the servlet architecture and HTTP requests. This configuration means that each request opens a new socket connection to the server. Once the client application has written the request to the server, it can simply sit in a loop, reading any intermediate responses and the final response. The client application can be guaranteed that the only information received by the client application on that socket is response information for the request.

With respect to processing requests, XML is the protocol used in the depicted examples. Specifically, the requests are HTTP servlet requests using XML to convey the request content.

Figure 11:
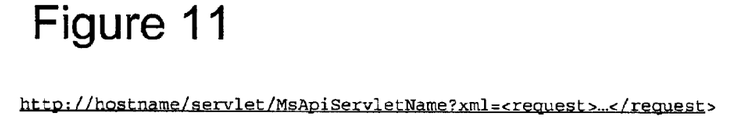
FIG. 11 is an illustration of an HTTP request using XML to convey request content in accordance with a preferred embodiment of the present invention.

Turning now to FIG. 11, an illustration of an HTTP request using XML to convey request content is depicted in accordance with a preferred embodiment of the present invention. The general form of the request is illustrated in FIG. 11 in which MsApiServletName is the actual name of a servlet class, and the request XML content is a value associated with an XML key.

In the depicted examples below, a number of example request and responses are presented. The elements, in these examples, are illustrated on different lines and with indentation to more clearly illustrate the structure of requests and responses.

Figure 12:
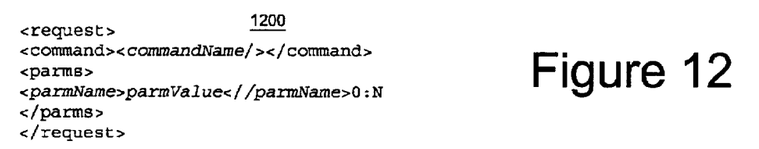
FIG. 12 is an example of an XML request in accordance with a preferred embodiment of the present invention.

In FIG. 12, an example of an XML request is depicted in accordance with a preferred embodiment of the present invention. Request 1200 illustrates the general form of a request processed by the mechanism of the present invention. Typically, XML requests include the structure illustrated in request 1200 and should contain a string with no new line characters.

Figure 13:
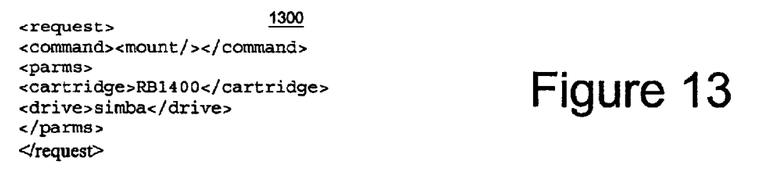
FIG. 13 is an example request to mount a tape in accordance with a preferred embodiment of the present invention.

Turning next to FIG. 13, an example request to mount a tape is depicted in accordance with a preferred embodiment of the present invention. Request 1300 is a specific example of the general form shown in request 1200 in FIG. 12. Request 1300 is a request used to mount a tape in a robotic storage library, such as ACS 200 in FIG. 2.

Figure 14:
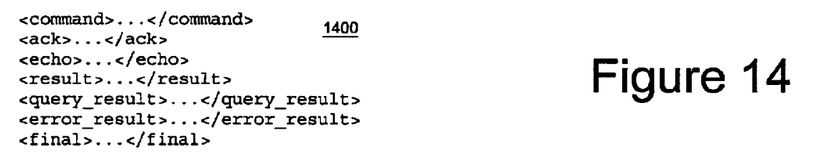
FIG. 14 is a diagram of an example response in accordance with a preferred embodiment of the present invention.

Turning now to FIG. 14, a diagram of an example response is depicted in accordance with a preferred embodiment of the present invention. Response 1400 is an example of a response returned to a client. Responses are returned in a synchronous manner. As a result, clients that generate more than one request at one time are required to be multi-threaded to handle the responses. A response, such as response 1400, is returned for each request. The server returns information back as terminated lines in request 1400 to allow a client to retrieve the response in well defined groups, rather than waiting for a buffer to fill up.

Figure 15:
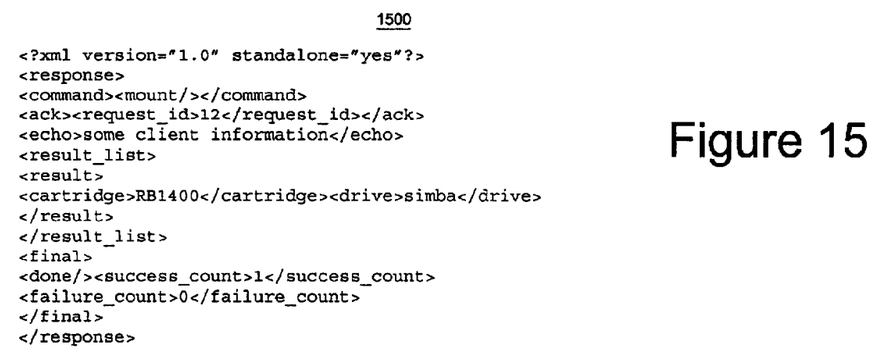
FIG. 15 is an example response to a mount command in accordance with a preferred embodiment of the present invention.

With reference next to FIG. 15, an example response to a mount command is depicted in accordance with a preferred embodiment of the present invention. Response 1500 is a specific example of the general form of the response shown in response 1400 in FIG. 14.

Figure 16:
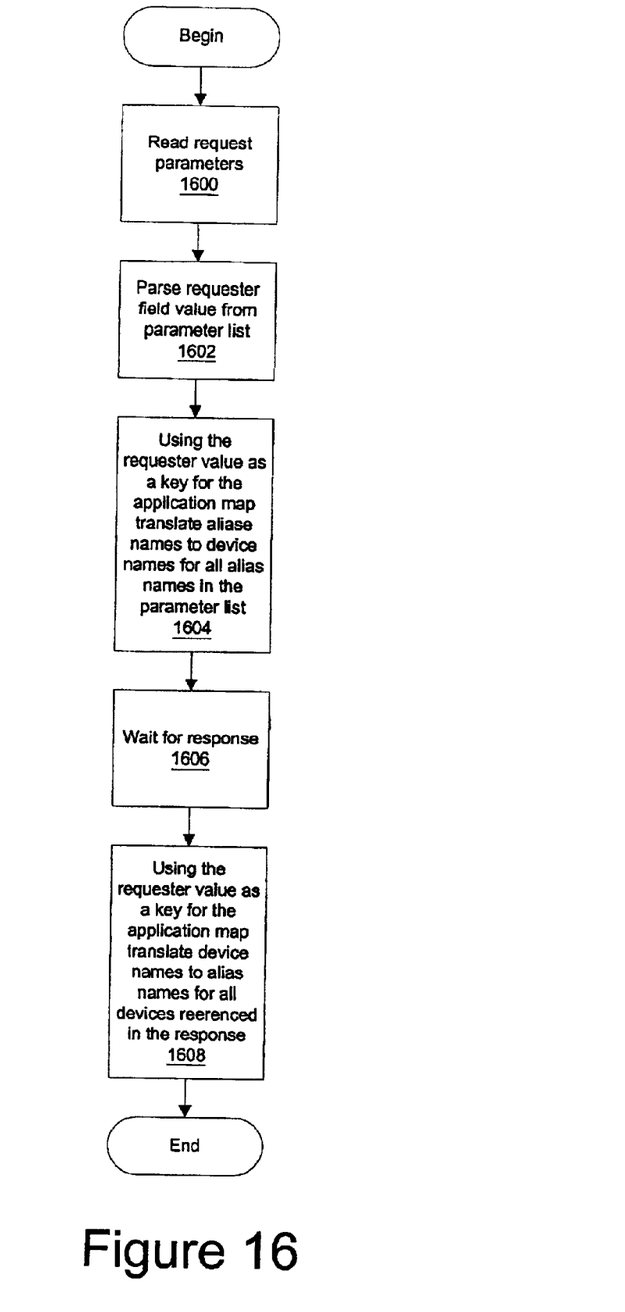
FIG. 16 is a flowchart of a process illustrating the parsing of a request is depicted in accordance with a preferred embodiment of the preferred embodiment of the present invention.

Turning now to FIG. 16, a flowchart of a process illustrating the parsing of a request is depicted in accordance with a preferred embodiment of the preferred embodiment of the present invention. The process begins by reading request parameters from the request (step 1600). Thereafter, the requester field value is parsed from the parameter list (step 1602). The alias name is translated into the device name for all alias names in the parameter list using the requester value as a key for the application map (step 1604). Thereafter, the process waits for a response in which alias names are required (step 1606). The requester value is again used as a key for the application map to translate the device names back into alias names for all devices referenced in the response received (step 1608) with the process terminating thereafter. The requester value is a character string and is used as a key by using the character representation as an index to a hashtable.

Thus, the present invention provides an improved method and apparatus for controlling robotic storage libraries from remote locations. In particular, the mechanism of the present invention allows for a user to control a robotic storage library from different locations without requiring each location to have robotic storage library specific software. These advantages are provided through the use of protocols commonly used to communicate over a particular type of network, such as, for example, HTTP and XML. Processes specific to a particular robotic storage library are handled by servlets containing APIs for those specific robotic storage libraries. A server is employed to receive the request and hand the request to the appropriate servlet. The servlet processes the request and generates the appropriate call to the appropriate API. The API communicates with the robotic storage library in the protocol native to the robotic storage library. In this manner, the server handles the specifics of accessing the robotic storage library through the protocol native to the robotic storage library in response to receiving a request from a client.

Additionally, the server also may send an applet or an HTML page to a client to provide a GUI for controlling a robotic storage library. Thus, the mechanism of the present invention allows for a user to control a robotic storage library from almost any location across a network. In this manner, access to robotic storage libraries is provided to a number of different types of platforms without requiring a specific application to be developed for each type of platform.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, although HTTP and XML are the protocols illustrated, other protocols common to a network may be used. For example, HTML or some other markup language may be used in place of XML. Further, the mechanism of the present invention also may be applied to other types of storage libraries other than robotic storage libraries handling tape. For example, the libraries may be those containing optical disks. Additionally, the mechanism of the present invention also may be applied to handling storage libraries, such as an array of disks. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for controlling a robotic storage library through a network, the method comprising:
   receiving a request originating from the network, wherein the request is in a protocol and includes a command for the robotic storage library;
   identifying a type for the request;
   responsive to the type corresponding to a storage library type for the robotic storage library, translating the request in the protocol into a format used by the robotic storage library to form a type specific request for the robotic storage library; and
   sending the type specific request to the robotic storage library.

2. The method of claim 1, wherein the robotic storage library is an automated cartridge system.

3. The method of claim 1, wherein the protocol is a markup language protocol.

4. The method of claim 3, wherein the markup language protocol is one of an extensible markup language protocol and a hypertext markup language protocol.

5. The method of claim 1, wherein the receiving, identifying, translating, and sending steps are performed in a server.

6. The method of claim 1, wherein the robotic storage library is a first robotic storage library and further comprising:
   responsive to the request corresponding to a storage library type for a second robotic storage library, translating the request into a format used by the second robotic storage library to form a type specific request for the second robotic storage library; and
   sending the type specific request for the second robotic storage library to the second robotic storage library.

7. The method of claim 1, wherein the request includes an identifier used to identify a particular robotic storage library for the request.

8. The method of claim 7, wherein the identifier is used to identify the type for the request.

9. The method of claim 6, wherein the first robotic storage library and the second robotic storage library are one of a same type and a different type.

10. The method of claim 1, wherein the translating step is performed in a servlet incorporating an application programming interface for the robotic storage library.

11. The method of claim 10, wherein the servlet is a Java servlet.

12. The method of claim 10, wherein the application programming interface is one of a proprietary storage library and a small computer system interface based storage library.

13. The method of claim 1, wherein the robotic storage library is an automated cartridge system and the command is one of a command to mount a tape, a command to dismount a tape, a command to move a tape into the robotic storage library, a command to move a tape out of the automated cartridge system, a command to identify contents in the library, and a command to list device states for devices in the automated cartridge system, and a command to change device states for devices in the automated cartridge system to make the devices selectively available to a client.

14. The method of claim 1, wherein the request is received in response to a user input to a graphical user interface on a client connected to the network.

15. The method of claim 14, wherein the graphical user interface is a Web browser.

16. A method in a data processing system for processing a request, the method comprising:
   receiving the request at an interface to a network, wherein the request is formatted using a protocol and includes a command;
   identifying a interface to a robotic storage library for the command in the request; and
   generating a call to the interface using the request.

17. The method of claim 16, wherein the interface is an application program interface for the robotic storage library.

18. The method of claim 16, wherein the request is in an extensible markup language format.

19. A distributed data processing system comprising:
   a network;
   a robotic storage library connected to the network; and
   a server connected to the network, wherein the server receives a request from the network in which the request is in a protocol for transport over the network and includes an identification, identifies a type using the identification, transforms the request into a specific format for the robotic storage library in response to the type being associated with the robotic storage library to form a type specific request, and sends the request to the robotic storage library.

20. The distributed data processing system of claim 19, wherein the network is an Internet.

21. The distributed data processing system of claim 19, wherein the network is at least one of a local area network, an intranet, and a wide area network.

22. The distributed data processing system of claim 19, wherein the robotic storage library is an automated cartridge system.

23. The distributed data processing system of claim 19, wherein the robotic storage library is connected to the network by the server.

24. The distributed data processing system of claim 19, wherein the robotic storage library is a robotic tape library.

25. The distributed data processing system of claim 19, wherein the robotic storage library is a first robotic storage library and further comprising:
   a second robotic storage library connected to the network.

26. The distributed data processing system of claim 19, wherein the protocol is a markup language protocol.

27. The distributed data processing system of claim 26, wherein the markup language protocol is one of an extensible markup language protocol and a hypertext markup language protocol.

28. The distributed data processing system of claim 19 further comprising:
a client connected to the network, wherein the client originates the request.

29. The distributed data processing system of claim 27, wherein the client includes:
a control process, wherein the control process generates the request in the type for the robotic storage library; and
an interface process, wherein the interface process translates the request into a format for transfer on the network to the server.

30. A data processing system for controlling a robotic storage library through a network, the data processing system comprising:
receiving means for receiving a request originating from the network, wherein the request is in a protocol and includes a command for the robotic storage library;
identifying means for identifying a type for the request;
translating means responsive to the type corresponding to a storage library type for the robotic storage library, for translating the request in the protocol into a format used by the robotic storage library to form a type specific request for the robotic storage library; and
sending means for sending the type specific request to the robotic storage library.

31. The data processing system of claim 30, wherein the robotic storage library is an automated cartridge system.

32. The data processing system of claim 30, wherein the protocol is a markup language protocol.

33. The data processing system of claim 32, wherein the markup language protocol is one of an extensible markup language protocol and a hypertext markup language protocol.

34. The data processing system of claim 30, wherein the receiving means, identifying means, translating means, and sending means are implemented in a server.

35. The data processing system of claim 30, wherein the robotic storage library is a first robotic storage library, wherein the translating means is a first translating means, and wherein the sending means is a first sending means and further comprising:
second translating means responsive to the request corresponding to a storage library type for a second robotic storage library, for translating the request into a format used by the second robotic storage library to form a type specific request for the second robotic storage library; and
second sending means for sending the type specific request for the second robotic storage library to the second robotic storage library.

36. The data processing system of claim 30, wherein the request includes an identifier used to identify a particular robotic storage library for the request.

37. The data processing system of claim 36, wherein the identifier is used to identify the type for the request.

38. The data processing system of claim 35, wherein the first robotic storage library and the second robotic storage library are one of a same type and a different type.

39. The data processing system of claim 30, wherein the translating means is implemented in a servlet incorporating an application programming interface for the robotic storage library.

40. The data processing system of claim 39, wherein the servlet is a Java servlet.

41. The data processing system of claim 39, wherein the application programming interface is one of a proprietary storage library and a small computer system interface based storage library.

42. The data processing system of claim 30, wherein the robotic storage library is an automated cartridge system and the command is of a command to mount a tape, a command to dismount a tape, a command move a tape into the robotic storage library, a command to move a tape out of the automated cartridge system, a command to identify contents in the library, and a command to list device states for devices in the automated cartridge system, and a command to change device states for devices in the automated cartridge system to make the devices selectively available to a client.

43. The data processing system of claim 30, wherein the request is received in response to a user input to a graphical user interface on a client connected to the network.

44. The data processing system of claim 43, wherein the graphical user interface is a Web browser.

45. A data processing system for processing a request, the data processing system comprising:
receiving means for receiving the request at an interface to a network, wherein the request is formatted using a protocol and includes a command;
identifying means for identifying a interface to a robotic storage library for the command in the request; and
generating means for generating a call to the interface using the request.

46. The data processing system of claim 45, wherein the interface is an application program interface for the robotic storage library.

47. The data processing system of claim 45, wherein the request is in an extensible markup language format.

48. A computer program product in a computer readable medium for controlling a robotic storage library through a network, the computer program product comprising:
first instructions for receiving a request originating from the network, wherein the request is in a protocol and includes a command for the robotic storage library;
second instructions for identifying a type for the request;
third instructions, responsive to the type corresponding to a storage library type for the robotic storage library, for translating the request in the protocol into a format used by the robotic storage library to form a type specific request for the robotic storage library; and
fourth instructions for sending the type specific request to the robotic storage library.

49. A computer program product in a computer readable medium for processing a request, the computer program product in a computer readable medium comprising:
first instructions for receiving the request at an interface to a network, wherein the request is formatted using a protocol and includes a command;
second instructions for identifying a interface to a robotic storage library for the command in the request; and
third instructions for generating a call to the interface using the request.

* * * * *